(12) United States Patent
Kim

(10) Patent No.: US 7,017,444 B2
(45) Date of Patent: Mar. 28, 2006

(54) TRANSMISSION FOR A BICYCLE PEDAL

(76) Inventor: Jun-Suck Kim, 675-21 Eungam-dong, Eunpeong-ku, Seoul (KR) 121-010

( * ) Notice: Subject to any disclaimer, the term of this patent is extended or adjusted under 35 U.S.C. 154(b) by 220 days.

(21) Appl. No.: 10/403,983

(22) Filed: Apr. 1, 2003

(65) Prior Publication Data

US 2004/0194572 A1 Oct. 7, 2004

(51) Int. Cl.
*G05G 3/00* (2006.01)
(52) U.S. Cl. .................. 74/594.3; 74/594.7; 403/322.2
(58) Field of Classification Search ............. 403/322.2, 403/362, 337, DIG. 6; 74/594.3, 594.7
See application file for complete search history.

(56) References Cited

U.S. PATENT DOCUMENTS

| | | | | |
|---|---|---|---|---|
| 4,019,230 A | * | 4/1977 | Pollard | 280/214 |
| 4,960,013 A | * | 10/1990 | Sander | 74/594.3 |
| 5,044,226 A | * | 9/1991 | Wu | 74/594.3 |
| 5,161,430 A | * | 11/1992 | Febey | 74/594.7 |
| 5,566,589 A | * | 10/1996 | Buck | 74/594.1 |
| 6,589,139 B1 | * | 7/2003 | Butterworth | 482/57 |

* cited by examiner

*Primary Examiner*—David A. Bucci
*Assistant Examiner*—Bradley J. Van Pelt

(74) *Attorney, Agent, or Firm*—Levine & Mandelbaum

(57) ABSTRACT

A transmission for a bicycle pedal has a fixed axle with an end operatively connected to a wheel of the bicycle and a guide axle connected to the fixed axle to form a crank. A bicycle pedal is rotatably mounted on a slider which is movably mounted on a guide portion of the guide rod for translation therealong. The ration of gyration of the pedal can be varied by sliding the pedal along the guide axle and/or telescoping the guide axle relative to the fixed axle. The slider and mounted pedal can be rotated toward the bicycle frame for compact storage.

9 Claims, 16 Drawing Sheets

TRANSMISSION FOR A BICYCLE PEDAL

BACKGROUND OF THE INVENTION

This invention relates to a bicycle pedal gearshift for enabling a change in speed change of a bicycle by adjusting the ratio of gyration of a pedal.

The driving gear of a bicycle generally includes a front wheel, a pedal connected to the wheel, a rear wheel and a chain connecting the two wheels.

The bicycle may be equipped with various gearshifts. The torque and speed of revolution to turn the pedals, and the rotational speed of the front and rear wheels may be adjusted to be suitable for a user by adjusting the gearshift.

Existing gearshifts may be classified into two types regardless of their various structures.

Some prior art gearshifts have a gear installed on the axle of the rear wheel of a bicycle, a gear cable connecting a chain to the gearshift and an operating mechanism installed on the handle of the bicycle to operate the gear cable.

There is another type gearshift enabling the adjustment of the ratio of gyration of a pedal through the installation of means of adjusting the length of a crank of the bicycle, and various means of adjusting the length are currently suggested.

Existing bicycle pedal gearshifts consist of numerous parts so that their configurations are complicated, causing them to frequently malfunction. The work involved in changing speed is difficult and such designs are not practically applied to and used for a bicycle.

SUMMARY OF THE INVENTION

An object of the invention to overcome the previously stated problems by providing a bicycle pedal gearshift for enabling the ratio of gyration of a pedal to be changed during its operation;

Another object of the invention is to enable a pedal to be folded in a line with a crank.

The above objects are accomplished by the bicycle pedal gearshift of the invention which has a fixed axle with one end connected to the wheel of bicycle and another end connect to a guide axle having a lower section in the form of a column with a square cross section and an upper section provided with a centrally threaded portion, and an upper section connected to the other end of the fixed axle. A crank includes the fixed axle and guide axle and a connector for attaching and supporting the fixed axle and guide axle. This bicycle pedal gearshift has a nut adapted to be threaded along the centrally threaded portion on the guide axle. A limit bolt is fixedly connected to the lower portion of guide axle. A slider having a central square bore is adapted to be translated along the lower guide section. A semicircular cut is formed on the lower portion of the slide for receiving the head of the limit bolt for stable support. Mounted on the slider are a pedal axle on which there is mounted a pedal, a ball for selectively being received in an upper supporting hole and a lower supporting hole in the guide axle when the slider is translated therealong, and a spring for urging the ball toward the supporting holes.

The bicycle pedal gearshift fixed axle has a cylindrical opening at its lower end for receiving the cylindrical upper section of the guide axle, the central threaded section and lower square section extending therebelow.

The bicycle pedal gearshift guide axle is formed with a plurality of vertically arranged holes. The fixed axle has a hole which can selectively be brought into registration with any one of the guide axle vertically arranged holes. A screw is inserted through the fixed axle hole and a selected one of the guide axle vertically arranged holes for fixing the fixed axle relative to the guide axle.

The bicycle pedal gearshift can alternatively have a fixed axle with a rectangular bore for receiving a guide axle having an upper section with a rectangular cross section, the guide axle having a central male screw section with a diameter smaller than width and depth of its upper section.

Accordingly, when the pedal is lifted by a foot in a vertical direction, or pulled in a horizontal direction, i.e., with the crank disposed vertically or horizontally, the slider is translated along the guide section of the guide axle and the ball is disengaged from the lower supporting hole and the slider can move to a position where it engages the nut where the ball can be received in the upper hole, and the translated slider on which the pedal is mounted is supported accordingly. This it can be seen that it is easy to adjust the ratio of gyration of the pedal quickly, and it is easy to change speed. Also, the length of crank can be adjusted by the above described connecting arrangement between the fixed axle and guide axle. Moreover, the range of speed change and utilization of space may be optimized by the allowable folding of the pedal inline with the crank upon storage of and moving of the bicycle.

DESCRIPTION OF THE PREFERRED EMBODIMENT

Figure 1:
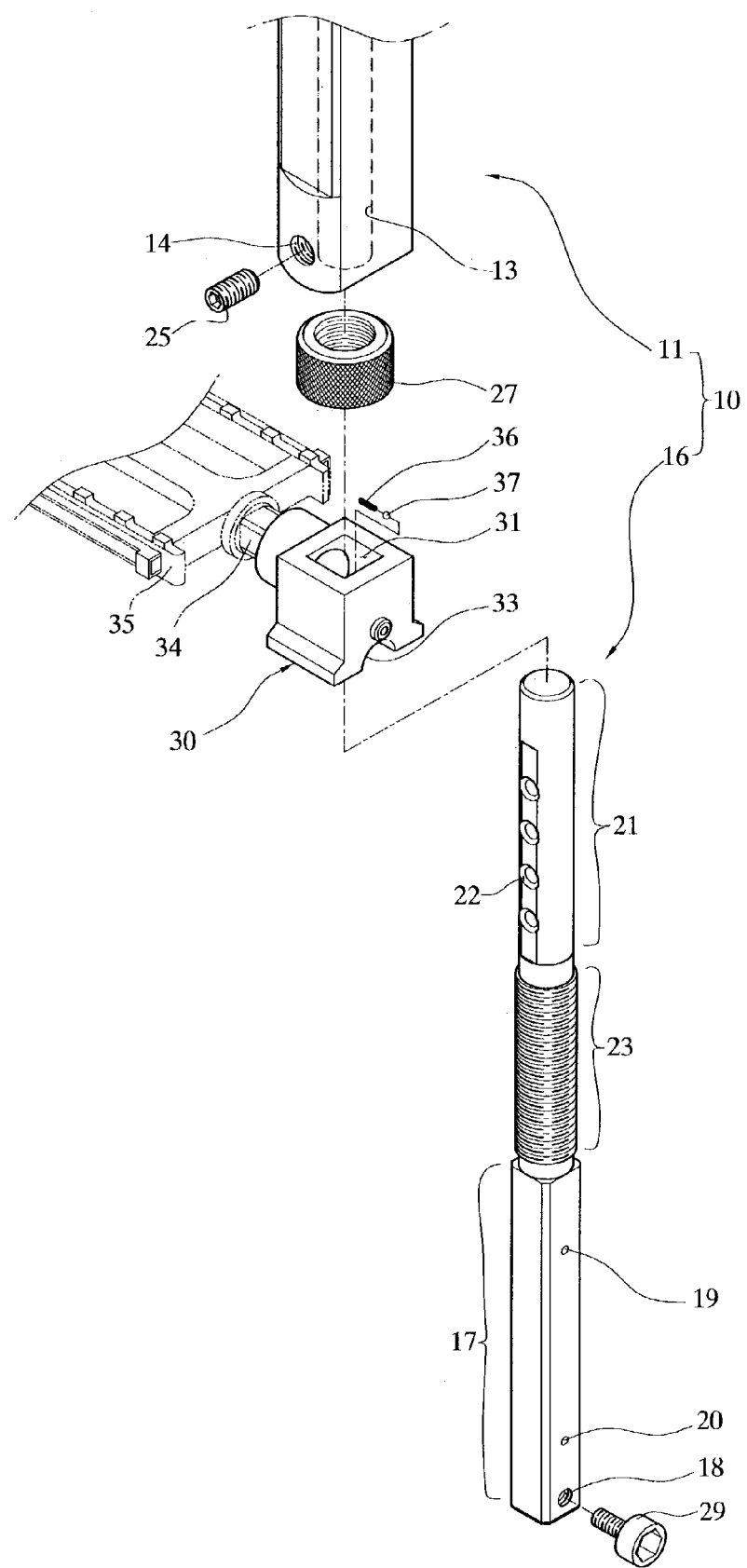
FIG. 1 is an exploded perspective view showing the bicycle pedal gearshift in accordance with a first embodiment of the invention.

Referring now to the drawings, a bicycle pedal gearshift according the invention is equipped with a fixed axle 11, 41, 52 having one end adapted to be connected to the wheel of bicycle, and a guide axle 17, 58 with a lower section in the form of a column having a square cross section, an upper connection section 21, 60 adapted to be connected to the other end of the fixed axle 11, 41, 52, and a central section having a male screw section 23, 62. A crank 10, 40, 51 includes a connector arrangement for being installed between the fixed axle 11, 41, 52 and guide axle 16, 43, 57 to fix and support the fixed axle 11, 41, 52 and guide axle 16, 43, 57. The bicycle pedal gearshift has a nut 27 adapted to be threaded along the male screw section 23,62 on the guide axle 16,43,57. A limit bolt 29 can be fixed and connected to the lower portion of guide axle 16,43,57. A slider 30 has a square bore 31 formed in its center for being translated along the guide section 17,58 on the guide axle 16,43,57. A blind hole 32 is formed inside the bore on one side of the slider 30, on the bottom of which there is also formed a semicircular limit groove 33 for receiving the head of the limit bolt 29 so that it can be stably supported. The slider 30,65 is equipped with a pedal axle allowing the pedal 35,69 to be connected to the side of the slider opposite the side on which the ball 37 is mounted. The ball 37 can be selectively received in an upper supporting hole 19 and a lower supporting hole 20 on the side of the guide axle 16,43,57 as the slider 30,65 is translated under pressure from a spring 36 inserted in the blind hole 32 in the slider 30,65.

When the pedal 35, 69 is lifted by a foot in a vertical direction, or pulled in a horizontal direction, positioning the crank 10, 40, 51 vertically or horizontally, the slider 30, 65 is translated along the guide section 17, 58 of guide axle 16, 43, 57 and the ball 37 is released from the bottom supporting hole 20. As the slider 30, 65 moves toward nut 27 during the continual rotation of the pedal 35, 69, the ball 37 is received in the upper supporting hole 19 and the translated pedal 35, 69 is supported there. Hence, easy adjustment of the ratio of gyration of the pedal is enabled and quick and easy speed change is allowed. Also, adjusting the length of crank 10, 40, 51 by the above described connector arrangement is possible, and the range of speed change and utilization of space may be optimized by the allowable folding of the pedal with the crank inline upon storage of and moving the bicycle.

The detailed characteristics and advantages of the invention will be made more clear by the following descriptions referring to the drawings.

Referring to FIG. 1, the bicycle pedal gearshift of the invention is includes the crank 10, the slider slider 30 and the pedal which is mounted via an axle on the slider 30.

Figure 2:
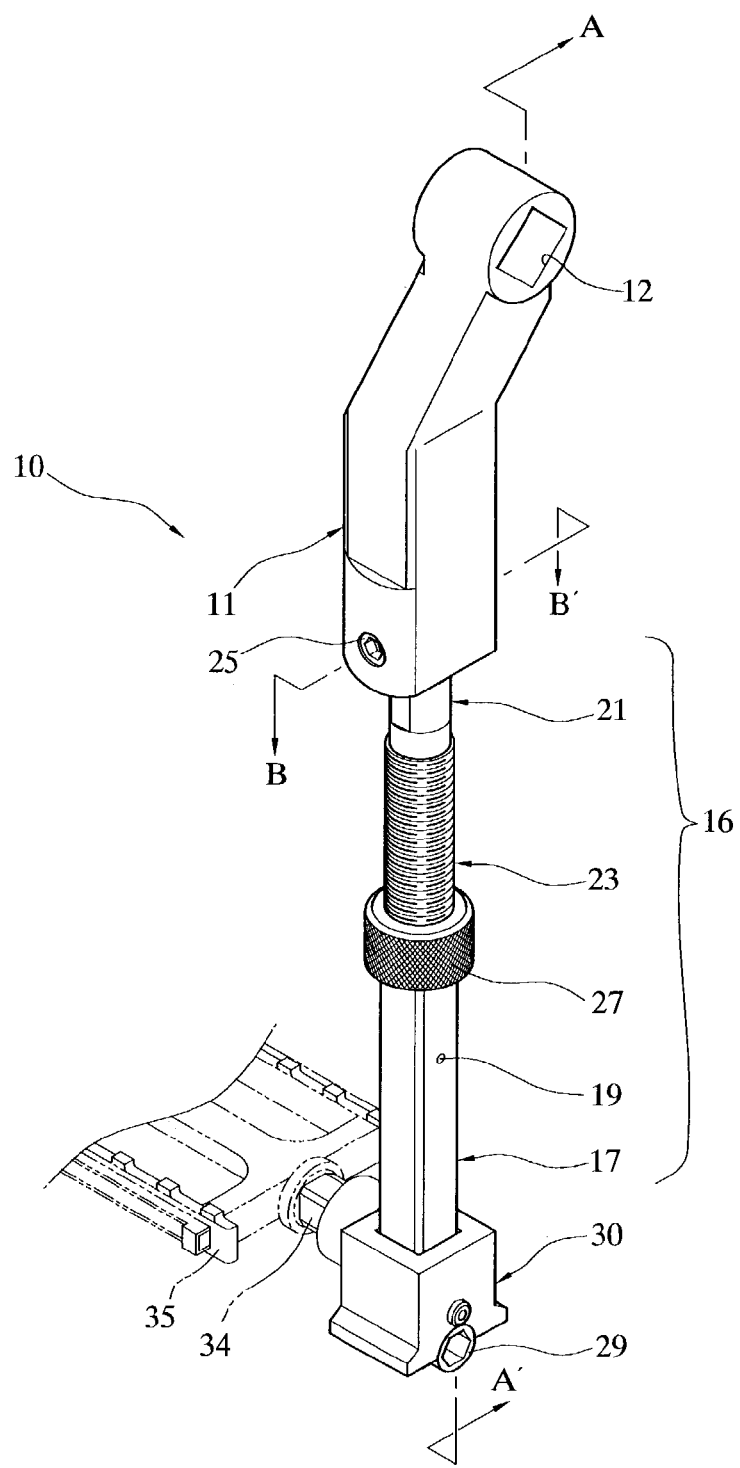
FIG. 2 is a perspective view the bicycle pedal gearshift of FIG. 1, assembled.
Figure 3:
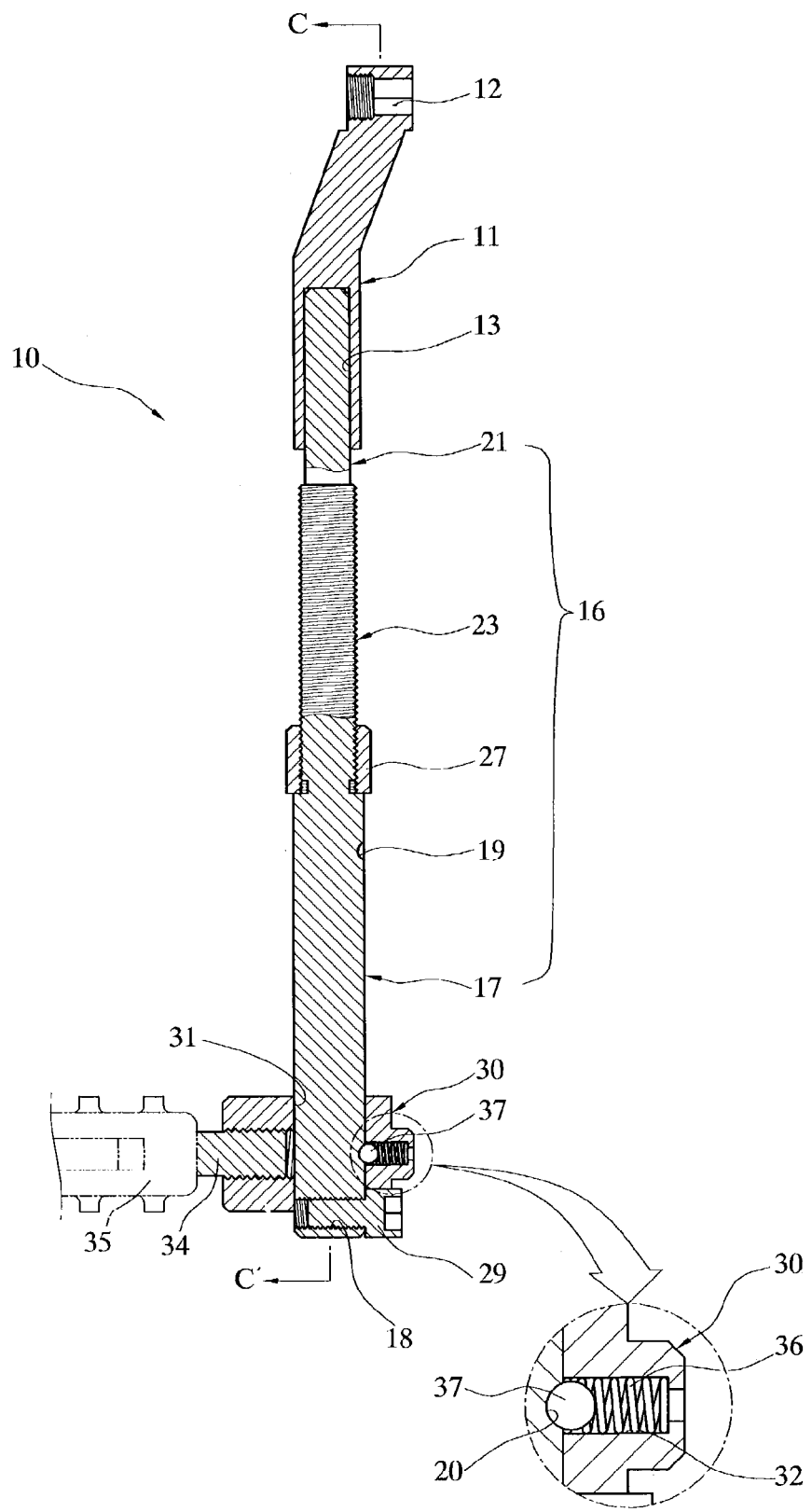
FIG. 3 is the sectional view taken through line A–A' of FIG. 2.
Figure 4:
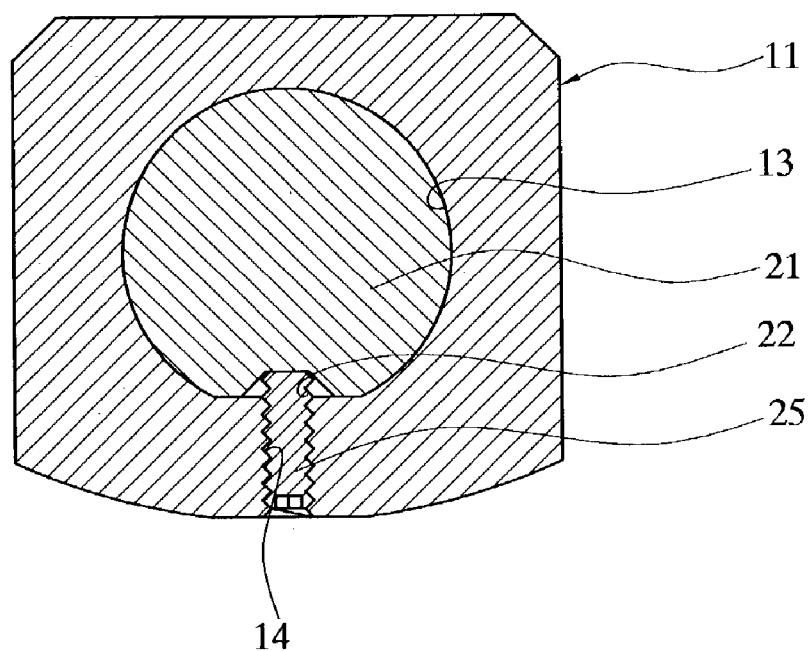
FIG. 4 is a sectional view taken through line B–B' of FIG. 2.

The crank 10 includes the fixed and guide axles 11 and 16, and the connector arrangement for connecting these two axles as shown in FIGS. 1, 2 and 3.

The fixed axle 11 has a mounting hole 12 at its upper end and an internal bore 13 inside its lower end, and a hole 14 for receiving a fixing screw 25 for purposes which will be explained later.

The guide axle 16 on which the guide section 17 having a column equipped with a square cross section is inserted into the square hole 31 of the slider 30 and moved relative to the slider, and the cylindrical upper connection section 21 is formed on the upper portion of guide axle 16 and the center of guide axle 16 has a threaded section.

The hole 18 formed at the lower end of guide section 17 of guide axle 16 receives limit bolt 29. A number of fixed holes 22 are vertically arranged along connection section 21.

The screw 25 is adapted to connect the fixed axle 11 and guide axle 16. More specifically, the set screw 25 is threaded through the hole 14 in axle 11 and passed into a selected one of the holes 22 of guide axle 16.

Therefore, the connection devices for crank 10 include the connection hole 14 of the fixed axle 11, the fixed section 21 of guide axle 16 and the set screw 25 which is adapted to be connected to the above two components.

The nut 27 which is to be mounted on the guide axle 16 of crank 10 is threaded onto the male screw section 23 of guide axle 16 and limits the translation range of the slider 30 as will be explained, and the previously mentioned male screw section of limit bolt 29 is received in the fixed hole 18 of guide axle 16, so that the limit groove 33 of slider 30 can be engaged by the head of limit bolt 29.

The slider 30 is mounted on the guide section of guide axle 16, and the square hole 31 is formed to allow the slider to be translated along the guide section. There is a blind hole 32 formed inside of the slider in which the spring 36 and the ball 37 are to be inserted in turn.

Therefore, when the slider 30 is inserted into the guide section 17 of guide axle 16 and translated, the ball 37 will be selectively captured either within the upper supporting hole 19 or lower supporting hole 20 of guide axle 16.

The semi-circular groove 33 of is formed on one side of the slider 30 for being stably supported on the head of limit bolt 29 at the lower limit of travel of slider 30, and the pedal axle 34 is fixed to the other side of slider 30 for receiving pedal 35.

As previously stated, the slider 30 of the bicycle pedal gearshift of the invention is mounted on the guide section 17 of guide axle 16, and the nut 27 is connected to the male screw section 23 of guide axle 16, and the upper end of fixed axle 11 of crank 10 is connected to the chain wheel of the bicycle after the fixed axle 11 is connected to the connection section 21 of guide axle 16. In this configuration, the gearshift of the invention is installed on the bicycle.

This bicycle pedal gearshift of the invention is normally operated similarly to one on a common bicycle as shown in FIGS. 2 and 3., upon, The pedal 35 is escalated by lifting the toe with the crank positioned vertically, whereby the pedal is pulled up to the horizontal direction with the crank positioned horizontally.

The guide section 17 of guide axle 16 is in the form of a rectangular parallelepiped, and the perimeter of square hole 31 of slider 30 contacts the four sides of guide section 17, whereby the slider 30 can be translated along the guide section 17 when the guide section 17 is has a horizontal direction, but if the slider 30 is not in a horizontal position, the slider 30, and the pedal mounted on the slider are not translated.

Figure 5:
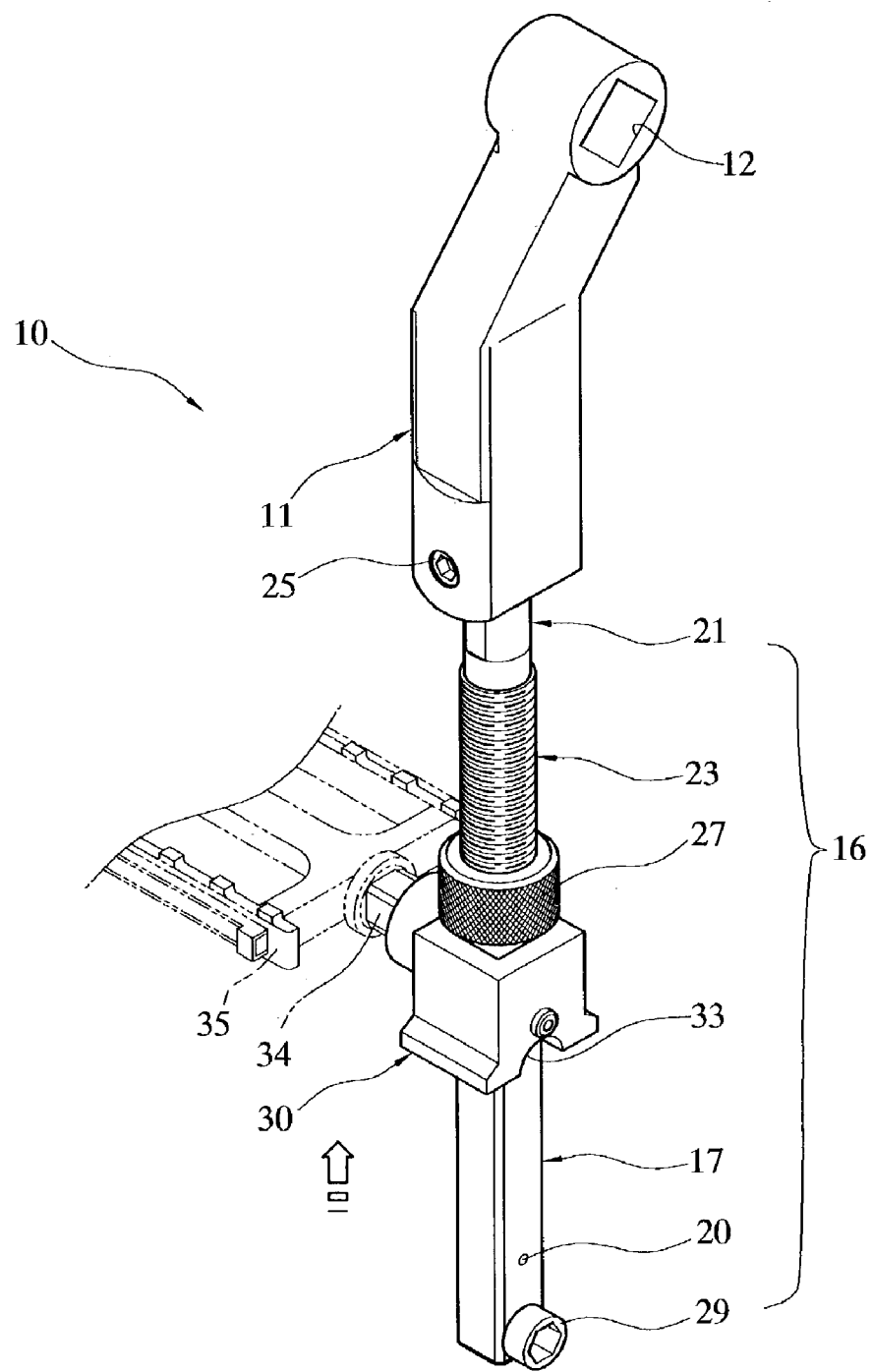
FIGS. 5 & 6 are perspective views showing the invention of FIG. 1 with different ratios of gyration of a pedal.
Figure 6:
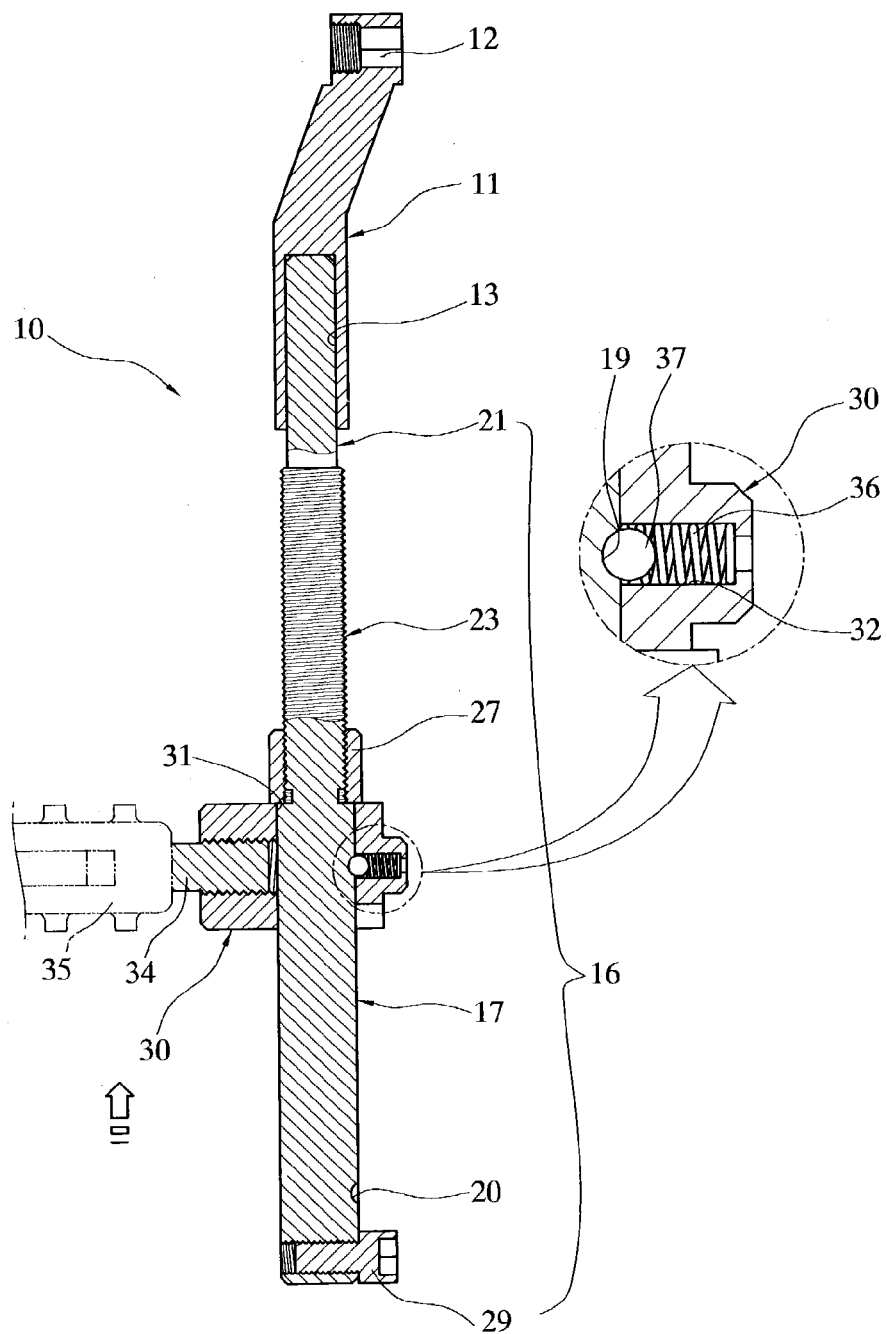

For example, when the pedal 35 is lifted by the toe while the crank 10 is positioned vertically, or the pedal 35 is pulled in a horizontal direction wile the crank 10 is positioned horizontally, the direction of lifting or pulling the pedal 35 corresponds to the position of the crank 10, and the contacting resistance between the four sides of guide section 17 and four sides of the slider within square hole 31 is minimized, so the slider 30 is translated along the guide section 17 as shown on FIG. 5.

But, if the pedal 35 is lifted when the crank 10 is not vertically positioned, or the pedal 35 is pulled in a horizontal direction when the axle of crank 10 is not horizontally positioned, substantial friction occurs between the four sides of guide section 17 and the four sides within square hole 31, whereby the slider 30 is not translated.

Therefore, the pedal 35 must be lifted while the crank is positioned vertically, or the pedal must be pulled in a horizontal direction while the crank is positioned horizontally in order to translate the pedal when the bicycle is under operation. In other words, only when the direction of crank 10 corresponds to the direction of force can the slider 30 be translated along the guide section 17.

When revolving the crank 10 by providing force to the pedal 35 to move the bicycle forward, the slider 30 is not translated along the guide section 17 of guide axle 16, as will be explained in more detail below.

When pedaling to move the bicycle forward, pedaling accelerates the bicycle when the crank 10 is within a range of more than 0° and less than 180° relative to the vertical. But when the crank is precisely positioned at 0° or 180° pedaling is difficult 35 and the bicycle is not accelerated, even during pedaling.

When pedaling while the crank 10 is within the range of between 90° and 135°, the bicycle is readily accelerated, so users normally pedal to accelerate the bicycle at this time, and the appropriate way of pedaling is from up to down, in other words, to pedal vertically.

Therefore, to move the bicycle forward by transmitting the force to the pedal, the direction of application of force to the pedal 35 must differ from the position of crank 10, and the slider 30 is not translated along the guide section 17 of guide axle 16 by the force applied to revolve the crank 10.

In accordance with the previously stated principles, the speed change process of the bicycle pedal gearshift of the invention will be described as follows:

To reduce the ratio of gyration of pedal 35 under the conditions shown in FIGS. 2 and 3, the pedal 35 is lifted while the crank 10 is vertical, or the pedal 35 is pulled while the crank 10 is horizontal, at which time the slider 30 is translated along the guide section 17 of guide axle 16.

If the user keeps translating the pedal 35, the ball 37 is captured in the upper supporting hole 19 of guide axle 16 and the slider 30 and guide axle 16 are fixed. The upper limit of slider 30 is determined by the nut 27 which, when engaged, prevents further translation of slider 30.

Conversely, to increase the ratio of gyration of pedal 35, the pedal 35 is pressed downwardly after balancing the crank 10 vertically, or the pedal 35 is pushed in a horizontal direction after balancing the crank 10 horizontally, and the slider 30 is translated along the guide section 17 until the limit groove 33 of slider 30 is supported on the head of limit bolt 29 and translation is limited upon the ball's being captured in lower supporting hole 20.

As previously stated, the user may adjust the height of pedal 35 to be suitable for accelerating the speed of the bicycle according to the user's height by simply adjusting the ratio of gyration of pedal 35.

The bicycle pedal gearshift of the invention allows the user to adjust the ratio of gyration of pedal 35 by using the combined structure between the guide section 17 of guide axle 16 and slider 30, and the connection between the fixed axle 11 and guide axle 16.

Figure 7:
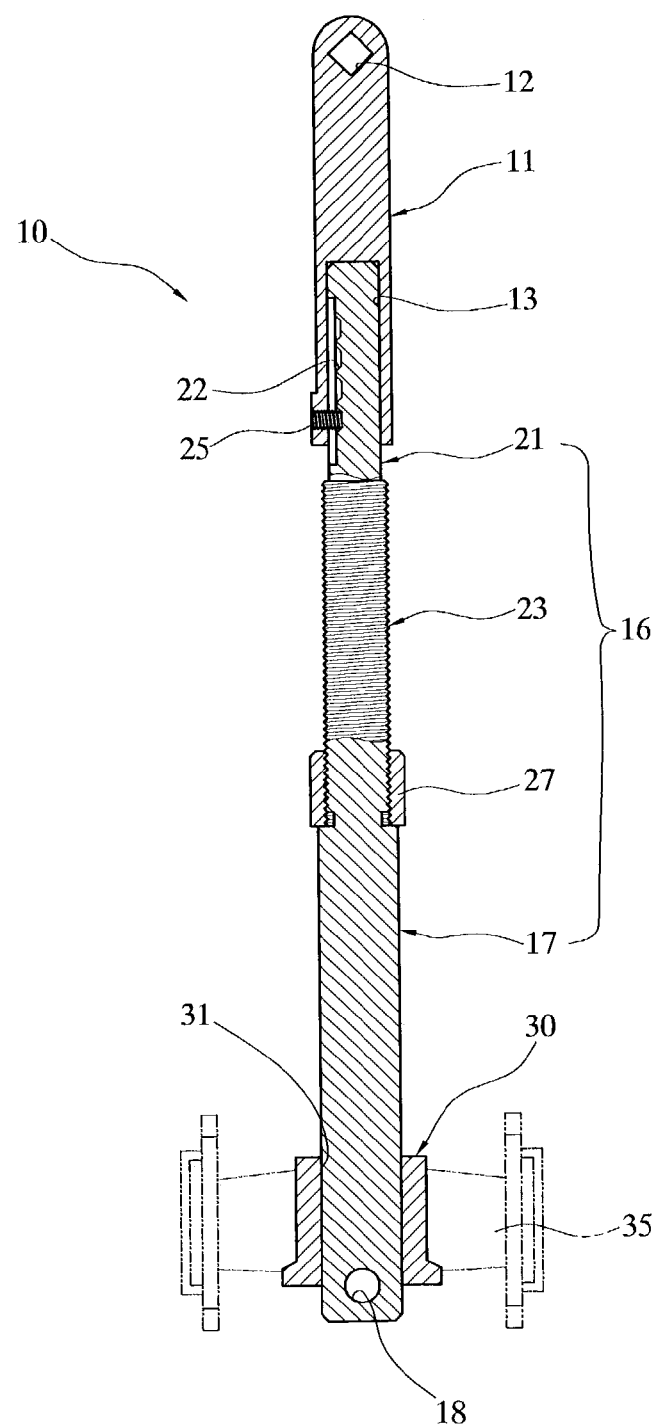
FIGS. 7 and 8 are the sectional views taken through line C–C' of FIG. 3 showing the invention of FIG. 1 with different lengths of the crank.
Figure 8:
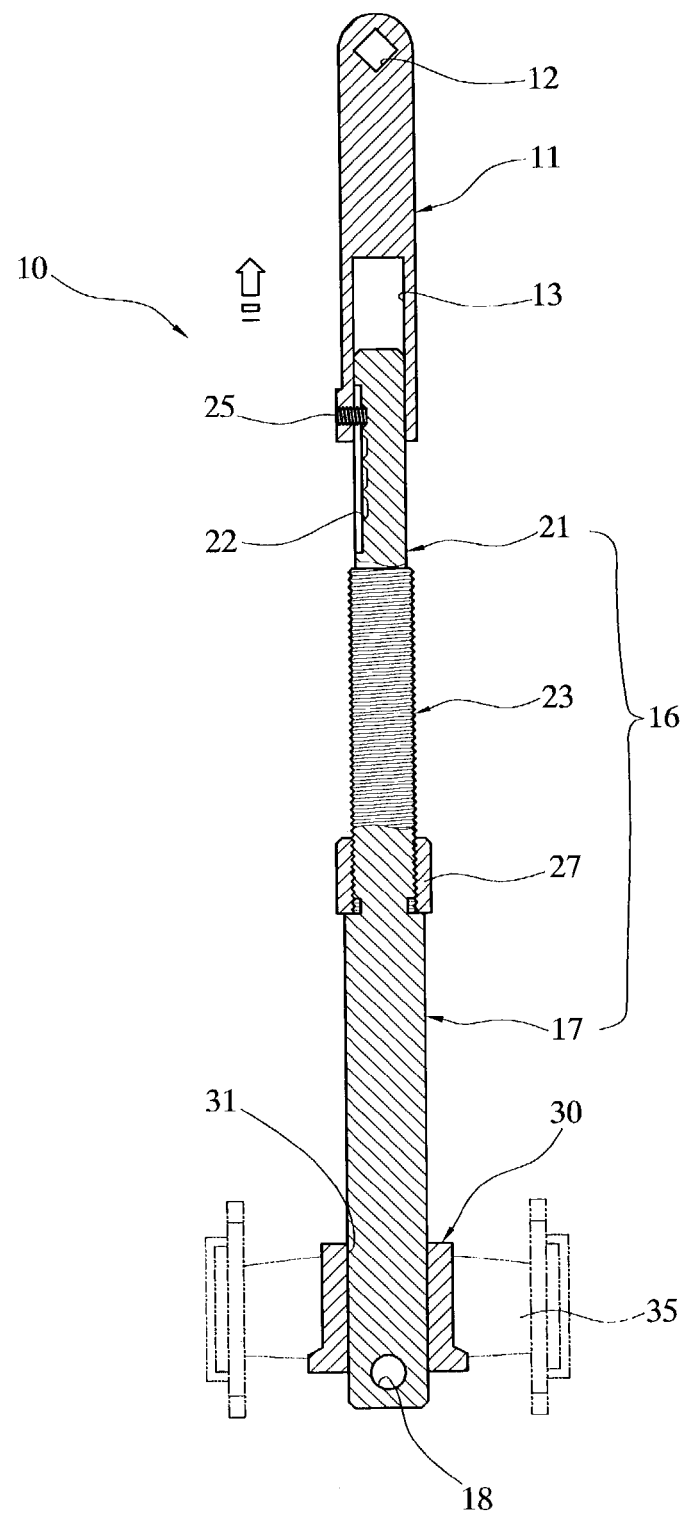

In other words, the ratio of gyration of pedal 35 can be increased from the disposition shown in FIG. 7 to the disposition shown in FIG. 8 by releasing the set screw 25 and lowering the guide axle 16 relative to the fixed axle 11 after which the guide axle 16 is fixed relative to the fixed axle 11 by combining rotation of set screw 25 fully into a corresponding hole 22 as shown on FIG. 8.

Therefore, the bicycle pedal gearshift of the invention enables the user to adjust the ratio of gyration of pedal 35 by using the combined structure between the guide section 17 of guide axle 16 and slider 30, and the connection between the fixed axle 11 and guide axle 16.

Figure 9:
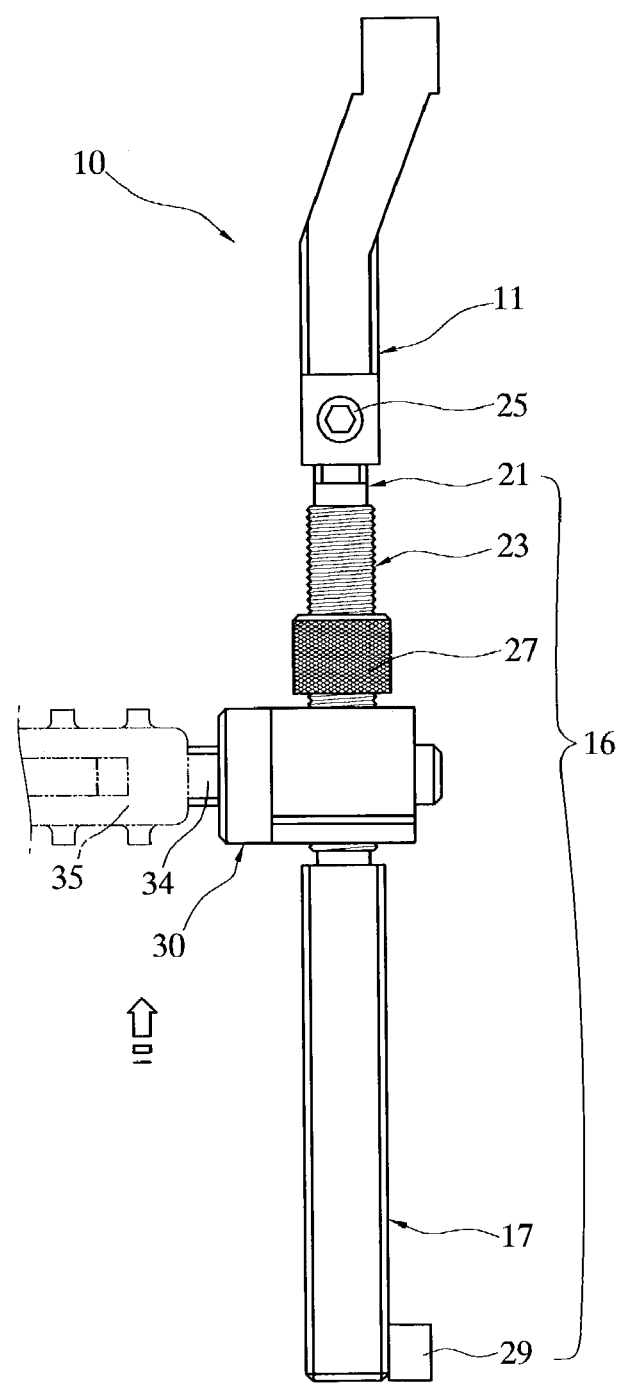
FIGS. 9–11 are the sectional views showing dispositions of the pedal as it is folded to a position inline with the crank.
Figure 10:
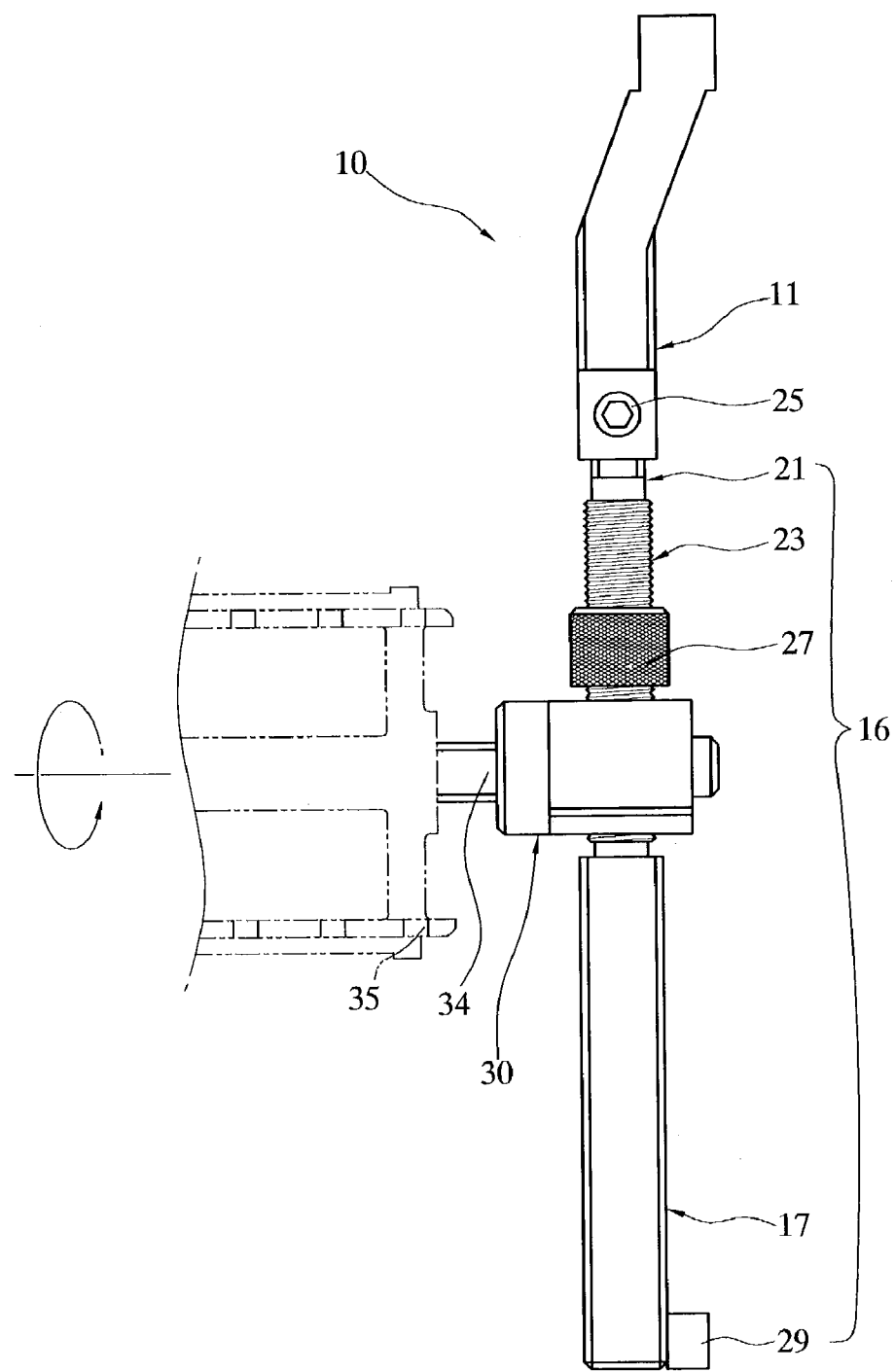
Figure 11:
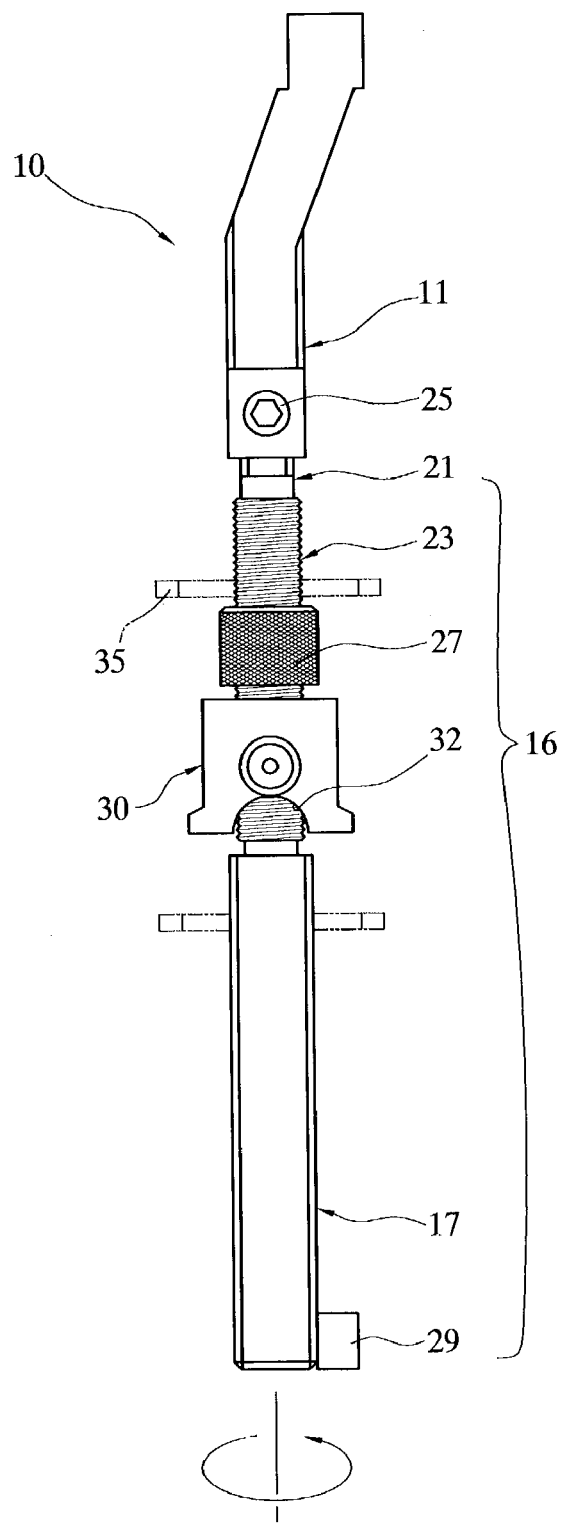

FIGS. 9 and 11 show other advantages of the bicycle pedal gearshift of the invention. When the slider 30 is translated to the perimeter of threaded section 23, the slider 30 leaves the guide section 17 and can freely revolve clockwise and counterclockwise as shown on FIG. 9. Under this condition, the pedal 35 can be brought even closer to the bicycle body by rotating the pedal 35 about its axis to a plane parallel to the axle of crank 10 as shown on FIG. 10 and revolving the slider 30 90 degrees as shown on FIG. 11.

This it is seen that reducing the entire width of the bicycle is possible whereby the user may insert and store the bicycle in the relatively narrow space such as the trunk of a car.

The bicycle pedal gearshift of the invention has many advantages as follows:

First, speed change is available by adjusting the size of the orbit of the pedal 35 through the adjustment of the ratio of gyration of the pedal 35.

Second, adjusting the height of pedal 35 to be suitable for people of different height is possible, whereby the invention allows users to ride a bicycle under optimized conditions thereby reducing the likelihood of an accident.

Third, even the user who have legs of different lengths due to physical handicap may conveniently use the bicycle as it is possible to adjust the height of only a pedal.

Fourth, easy adjustment of the ratio of gyration of a pedal 35 is possible even during a ride. When lifting the pedal 35, using the toe, with the crank 10 positioned vertically, or pulling the pedal 35 to a horizontal position with the crank 10 disposed horizontally, the ratio of gyration of pedal 35 is easily reduced, and as previously stated, if pressing or pushing the pedal 35, the ratio of gyration of pedal 35 is easily increased, so the user may simply adjust the ratio of gyration of the pedal 35 even during a ride.

Fifth, the user may adjust the ratio of gyration of the pedal 35 in diverse ways. The user may adjust and firmly fix the height of pedal by using the adjustable connection between the fixed axle 11 and connection section 21 of guide axle 16. Also, easy and quick adjustment of the height of pedal 35 is possible during a ride by using the combined structure between the slider 30 and guide section 17 of guide axle 16.

Therefore, the bicycle pedal gearshift of the invention may be made suitable for the needs of users by adjusting the ratio of gyration of pedal 35 depending on who the user is, number of users, and frequency of adjusting the ratio of gyration of pedal 35.

Sixth, the number of components of the gearshift is small and the configuration of the gearshift is simple. Parts of the bicycle pedal gearshift of the invention such as nut 27, set screw 25, limit bolt 29, ball 37 and spring 36, other than the fixed axle 11, guide axle 16, and slider 30 are easy to purchase, and production and assembling of parts is relatively simple, whereby the production cost may be reduced.

Seventh, upon storing the bicycle in a narrow space such as the trunk of a car, storage of existing bicycles is difficult or sometimes impossible, but according to the instant invention, the pedal 35 may be moved closer to the bicycle body, so the entire width of the bicycle is minimized and the user may insert and store the bicycle in a relatively narrow space such as the trunk of car.

Figure 12:
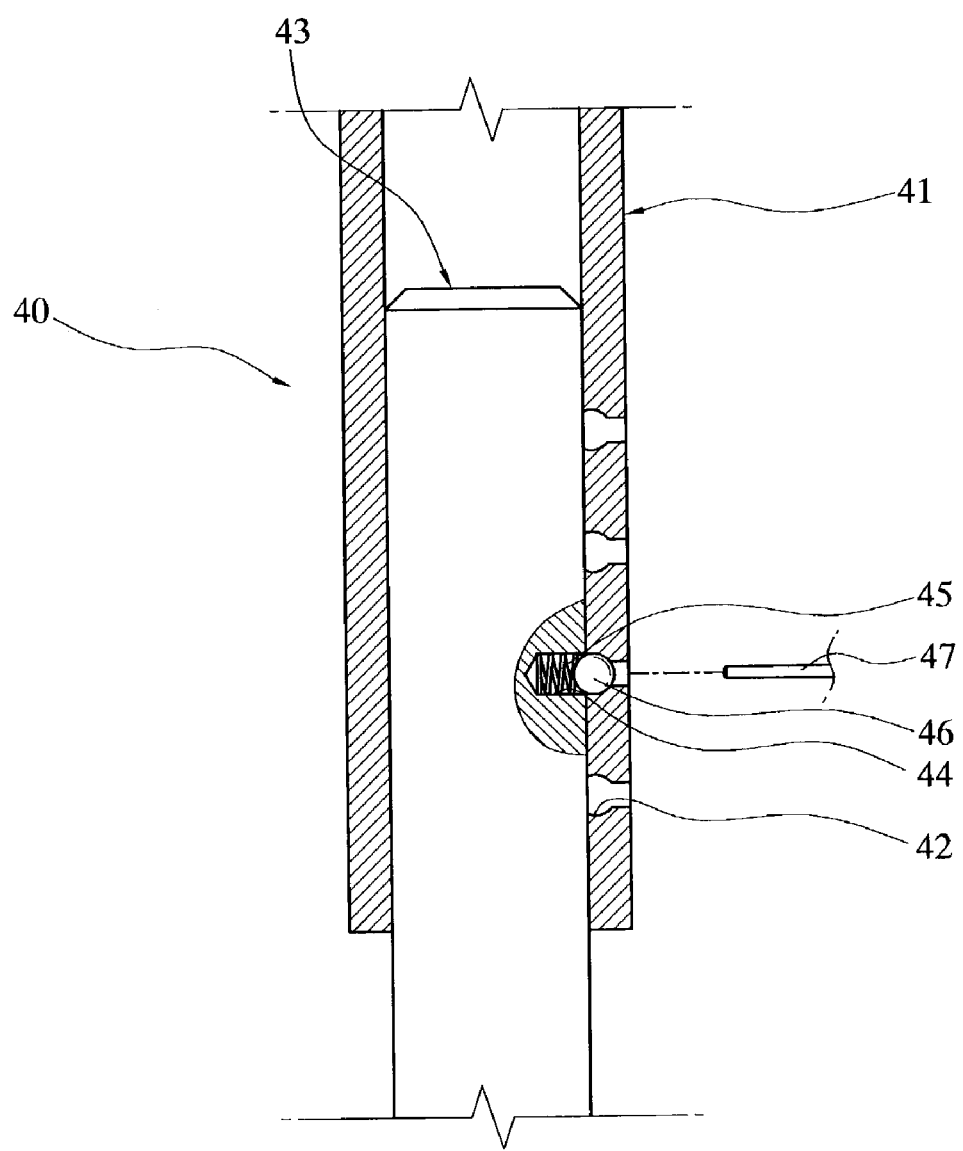
FIG. 12 is a partially magnified sectional view showing a first alternative embodiment of a portion of the invention.

FIG. 12 is a partially magnified sectional view showing an example of using the bicycle pedal gearshift of the invention in another way.

The connective device of this bicycle pedal gearshift includes a fixed axle formed with a plurality of supporting holes 42 arranged vertically, a guide axle 43 in which there is formed a spring channel 44 for corresponding to a selected one of the supporting holes 42, a spring disposed within the spring channel 44, and a ball for being captured within the selected one of the supporting holes.

Therefore, the user may adjust the length of crank 40 by lowering or elevating the guide axle 43 after inserting the ball for crank 46 which ball is pressed by a tool such as pressing pin 47 into the spring slot, and the effect is the same as the one of the connecting devices shown in FIGS. 1 and 11.

Figure 13:
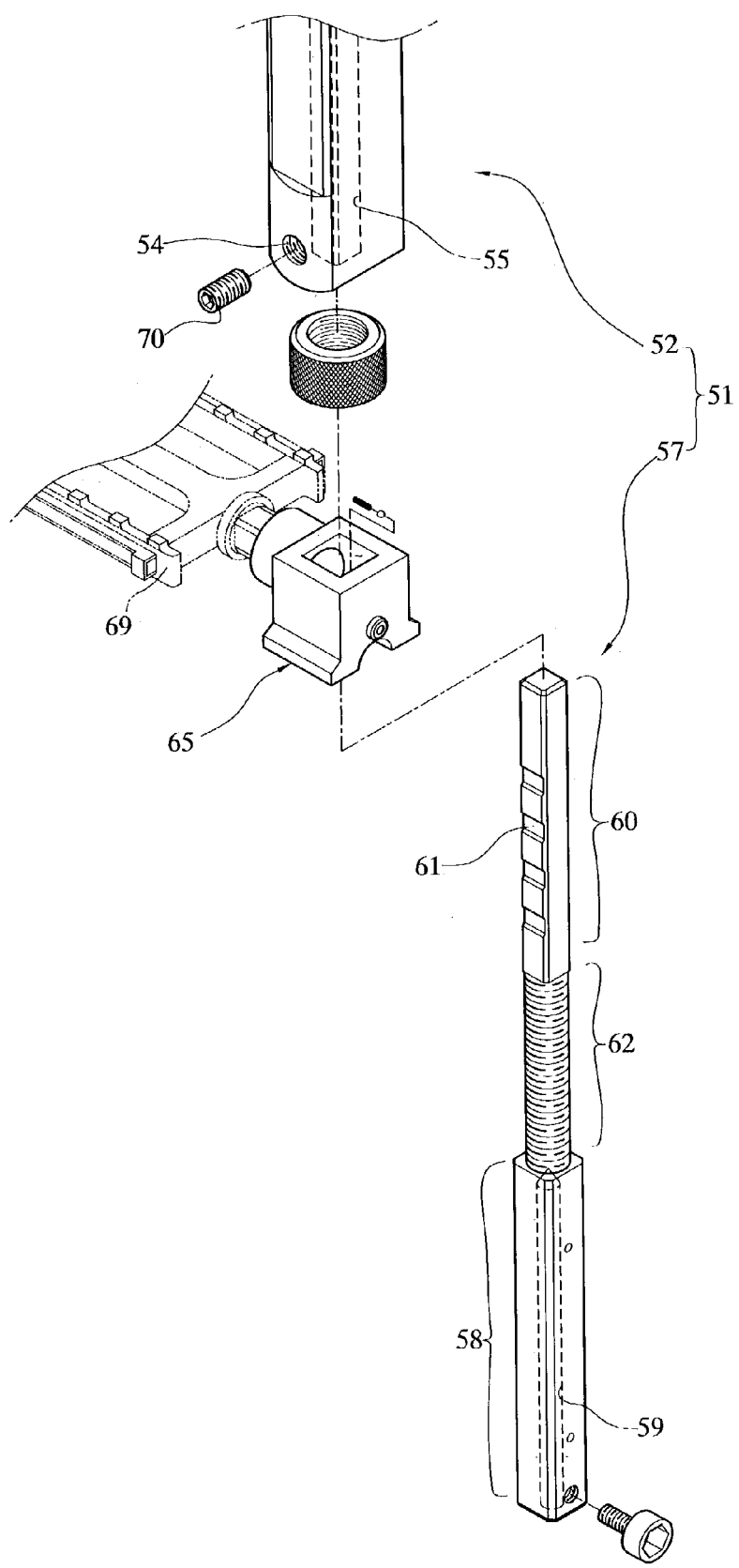
FIG. 13 is an exploded perspective view showing the bicycle pedal gearshift in accordance with a another embodiment of the invention.
Figure 14:
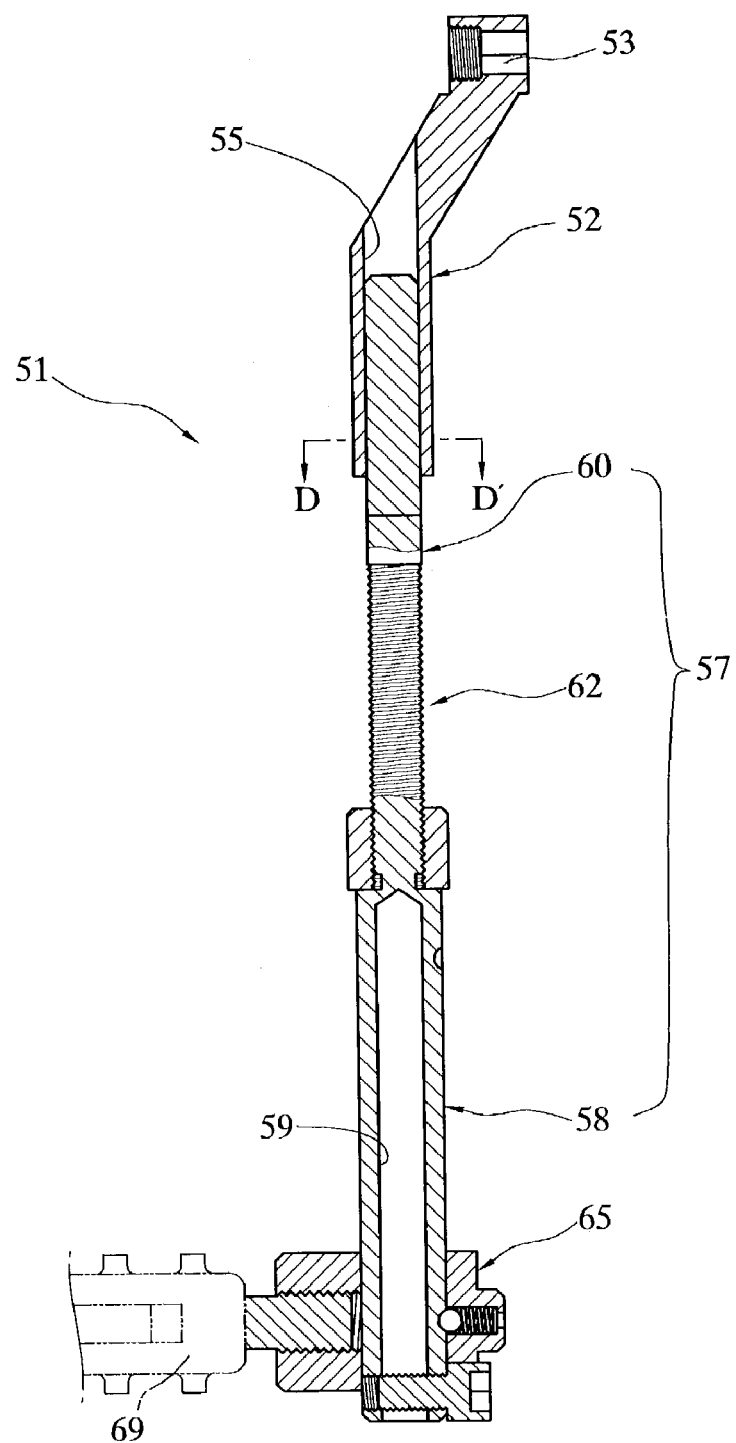
FIG. 14 is a perspective view the bicycle pedal gearshift of FIG. 13, assembled.
Figure 15:
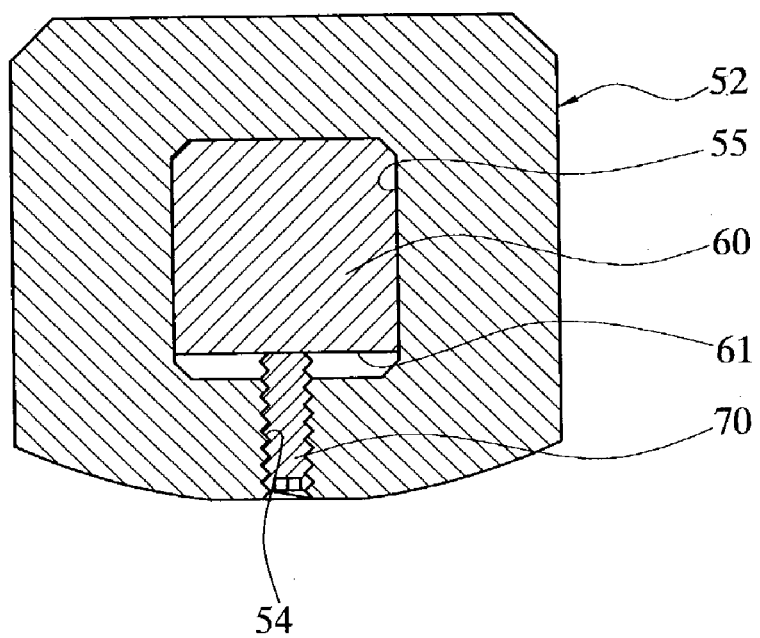
FIG. 15 is a sectional view taken through line DD of FIG. 14.

FIGS. 13–15 are an exploded perspective view, combined sectional view, and sectional view taken through line d—d, respectively, showing another operative example of the bicycle pedal gearshift of the invention. There is shown a crank 51, slider 65 and a pedal 69 adapted to be connected to a side of the slider 65 via a hinge. The crank 51 includes a fixed axle 52, guide axle 57, and the connector for combing these two axles as shown in FIGS. 13–15.

In the fixed axle 52, connecting holes 53 are formed on the upper portion and connecting hole 54 is formed on the lower portion. A rectangular bore 55 is formed in the center of this axle.

The guide axle 57 is has a guide section 58 formed with a hollow bore 59 on a lower portion, a rectangular connection section 60 adapted to be received in the rectangular bore 55 on the fixed axle 52 on an upper portion, and a threaded section 62 having a diameter smaller than the width and depth of the central portion. Formed on the connection section 60 are a plurality of grooves 61 for receiving a set screw 70 after being threaded into a connection hole 54.

Here, the connection device refers to the connection hole 54 on the fixed axle 52, the grooves 61 on the guide axle 57. and fixing screw 70

In the bicycle pedal gearshift of the invention in accordance with this embodiment, slider object 65 is mounted on guide section 58 on guide axle 57, connection section 61 on guide axle 57 is received within the rectangular bore in the fixed axle 52 and fixing screw 70, is threaded through connection hole 54 on fixed axle 52 and received in one of the grooves 61.

The bicycle pedal gearshift of this embodiment of the invention has the following advantages:

First, the rectangular bore 55 in the axle 52 is penetrated by a rectangular parallelopiped so the guide axle cannot be moved right and left relative to the fixed axle and the connection is snug.

Second, the rectangular bore penetrates the fixed axle 52, whereby under the condition of the fixed axle 52 and guide axle 57 shown in FIG. 3, the end portion of connection section 60 on the guide axle 57 can be withdrawn relative to connection hole 54, thereby enabling the length of crank 51 to be minimized and enabling diversifying the range of speed change of the bicycle.

Third, the hollow section 59 formed in the guide section 58 on the guide axle 57 reduces the weight of guide axle 57 thereby making lifting moving the bicycle easier. In manufacturing of the guide axle 57, materials are saved and manufacturing cost is reduced.

Figure 16:
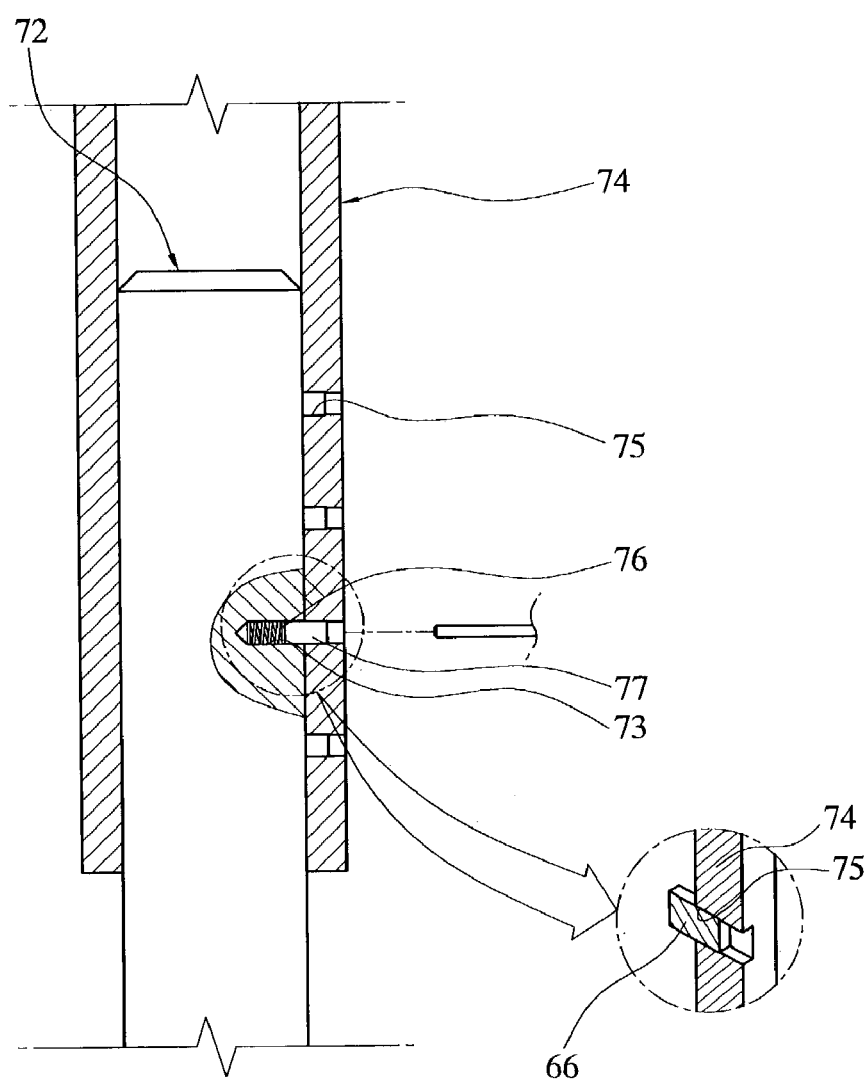
FIG. 16 is the partially magnified sectional view showing a portion of still another embodiment of the invention.

FIG. 16 shows another operative example of a connection device for the bicycle pedal gearshift of the invention in a partially enlarged sectional view. The bicycle pedal gearshift has a fixed axle 74 formed with a plurality of supporting holes aligned in one side, and guide axle 72, in which there is formed a rectangular spring bore 73 in one side near an upper end, for being selectively aligned with one of the supporting holes 75. A spring for crank 76 is received within spring bore 73. A pin 77 of square cross section is partially inserted into the spring bore 73 for being urged into one of the holes 75. The supporting holes 75 and spring bore 73 in which the connecting pin 77 is connected have corresponding images, so the guide axle 72 and fixed axle 74 are more firmly connected and supported as compared with the crank ball 46.

As previously stated, the bicycle pedal gearshift of the invention can optimize the utilization of space. When lifting the pedal to the vertical position or pulling the pedal to the horizontal position with the foot, with the crank 10, 40, 51 balanced vertically or horizontally, the slider is translated along the guide section of the guide axle and the ball leaves the bottom supporting hole. When the slider is in engagement with the nut, the ball is supported by the upper supporting hole and the translated pedal is supported accordingly, so easy adjustment of the ratio of gyration of the pedal is possible and quick and easy speed change is allowed and also, adjusting the length of the crank by the connecting device is possible, and the range of speed change and utilization of space may be optimized by the allowable folding of the pedal with the crank inline upon storage of and moving the bicycle.

The invention claimed is:

1. A bicycle pedal crank assembly comprising
a crank including a fixed axle having a first end adapted to be connected to the wheel of a bicycle, an opposite end with a hollow bore, a guide axle having a connecting section adapted to be received and telescoped within said hollow bore of said fixed axle, a guide section with a rectangular cross section, and a threaded section with a circular cross section intermediate said connecting section and said guide section,
a slider movably mounted on said guide axle for translation along at least a length of said guide section,
a pedal rotatably mounted on said slider,
a nut threaded onto said threaded section of said guide axle,
a stop mounted at an end of the guide section of said guide axle distal from said threaded section,
said slider being movable between said stop and said nut for changing the ratio of gyration of said pedal.

2. A bicycle pedal crank assembly in accordance with claim 1 wherein said guide section of said guide axle has a first opening proximate said nut and a second opening proximate said stop, and said slider has engagement means biased to releasably engage in said first opening when said slider is adjacent said nut and said second opening when said slider is adjacent said stop.

3. A bicycle pedal crank assembly in accordance with claim 1 wherein said fixed axle bore is cylindrical, said guide axle section is cylindrical for being slidably received in said fixed axle bore, and said guide section of said guide axle has a rectangular cross section.

4. A bicycle pedal crank assembly in accordance with claim 1 wherein said fixed axle comprises a side wall with an opening extending into said hollow bore, and a fastener receivable with said side wall opening for selectively penetrating into said hollow bore, and said guide axle comprises a side wall with a plurality of axially spaced openings whereby a selected one of said openings can be placed in registration with said fixed axle side wall opening for receiving said fastener to fix said guide axle to said fixed axle.

5. A bicycle pedal crank assembly in accordance with claim 1 wherein said fixed axle has a plurality of axially spaced openings along a wall within said bore, and
said guide axle has a spring mounted therein and a member urged by said spring toward said fixed axle wall with said bore for being releasably captured within one of said axially spaced openings as said guide axle is telescoped relative to said fixed axle.

6. A bicycle pedal crank assembly in accordance with claim 5 wherein said axially spaced openings are square.

7. A bicycle pedal crank assembly in accordance with claim 6 wherein said member comprises a pin having a square cross section sized to be slidably snugly received within each of said openings.

8. A bicycle pedal crank assembly in accordance with claim 1 wherein said bore in said fixed axle is rectangular, said connecting section of said guide axle has a square cross section for being slidably snugly received within said bore, and said threaded section of said guide axle has a diameter less than the width and depth of said connecting section.

9. A bicycle pedal crank assembly in accordance with claim 1 wherein said nut can be threaded along said threaded section of side guide axle to allow said slider to be translated from said guide section of said guide axle to said threaded section of said guide axle whereat said slider can be rotated about said guide axle for positioning said pedal for compact storage of said bicycle.

* * * * *